3,238,200
OXADIAZINEDIONES

Jack Bernstein and Kathryn Alice Losee, New Brunswick, N.J., assignors to Olin Mathieson Chemical Corporation, New York, N.Y., a corporation of Virginia
No Drawing. Filed June 27, 1963, Ser. No. 290,918
6 Claims. (Cl. 260—244)

This invention relates to oxadiazinediones. More particularly, the invention relates to novel 1,2,4-oxadiazinediones of the formula (I)

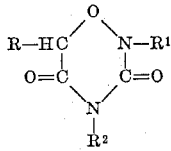

and to salts thereof.

The symbols R and $R^1$ in Formula I represent hydrogen and alkyl, especially lower alkyl groups such as methyl, ethyl, propyl, isoproyl, butyl, isobutyl, t-butyl, amyl and the like.

$R^2$ represents hydrogen, alkyl and B-lower alkyl. B represents basic nitrogen containing groups of less than 12 carbon atoms such as amino, lower alkylamino, e.g., methylamino, ethylamino, isopropylamino, etc., di-lower alkylamino, e.g., dimethylamino, diethylamino, dipropylamino, etc., and 5 to 7 membered nitrogen heterocyclics including piperidino, piperazino, $N^4$-lower alkylpiperazino, e.g., $N^4$-methylpiperazino, $N^4$-hydroxy-lower alkyl-piperazino, e.g., $N^4$-hydroxyethylpiperazino, $N^4$-lower alkoxy-lower alkyl-piperazino, e.g., $N^4$-methoxyethylpiperazino, morpholino, pyrrolidino, homopiperazino, thiamorpholino and the like.

The preferred compounds of Formula I are those wherein $R^1$ and $R^2$ both represent hydrogen and R represents hydrogen or lower alkyl.

The new compounds of this invention are produced by cyclizing a compound of the formula (II)

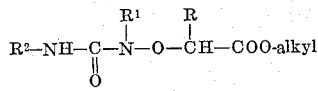

wherein the symbols have the same meaning as defined above,
by treatment with a metal alkoxide, preferably an alkali metal lower alkoxide such as sodium methoxide or sodium ethoxide.

The ureidooxy compounds of Formula II are novel compounds which may be derived from acids of the formula (III)

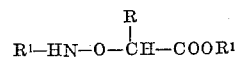

wherein R and $R^1$ have the same meaning as above, but $R^1$ of the $COOR^1$ group is hydrogen.

This acid, preferably in the form of an acid salt thereof, e.g., mineral acid salt such as the hydrochloride, is converted to its alkyl ester, i.e., $R^1$ of the $COOR^1$ group is then alkyl, preferably lower alkyl, such as the methyl or ethyl ester.

The ester of Formula III is then converted to the ureidooxy acid ester of Formula II, when $R^2$ is alkyl, by reaction with an isocyanate of the formula (IV)        

preferably in acid solution. When $R^2$ is hydrogen, this reaction may be effected by using a metal isocyanate, e.g., an alkali metal compound such as potassium isocyanate, in acid solution. When $R^2$ is hydrogen, the intermediate of Formula II may be cyclized and then the alkyl or B-lower alkyl group represented by $R^2$ is introduced into the 4-position of the completed ring by reaction with the halide $R^2$-hal in basic solution, e.g., alkali metal hydroxide such as sodium hydroxide.

The new compounds of this invention form salts. When at least one nitrogen atom of the ring system is unsubstituted, that is, either $R^1$ or $R^2$ is hydrogen or $R^1$ and $R^2$ both are hydrogen, the compounds will form metal salts with strong bases, e.g., alkali metal salts, such as the sodium salt, or alkaline earth metal salts, such as the calcium salt. If, however, $R^2$ represents a basic group, the compounds will form acid addition salts with strong acids, e.g., mineral acid salts, such as hydrohalic acid salts like the hydrochloride or hydrobromide, sulfates, nitrates and the like.

The new compounds of Formula I are useful as anticonvulsants. They may be administered orally or parenterally in conventional dosage forms such as tablets, capsules, injectables and the like by incorporating the oxadiazinedione or a pharmacologically acceptable salt thereof in conventional preparations. These new compounds also show cytotoxic activity by inhibiting Earle's L cells, NCTC 929, and Ehrlich ascites tumor cells in tissue culture.

The following examples are illustrative of the invention. All temperatures are in degrees centigrade.

Example 1

(a) *Hydroxylamine-O-acetic acid, ethyl ester hydrochloride.*—Hydrogen chloride gas (200 g.) is passed through a suspension of 55 g. (0.26 M) of hydroxylamine-O-acetic acid hemihydrochloride (Org. Syn., 27, p. 15) in 500 ml. of absolute alcohol at 0° until the alcohol is saturated. The mixture is allowed to come to room temperature, refluxed for one hour and allowed to cool overnight. The solid is filtered and washed with ether to yield 62 g. (75%) of product melting at 108–109°. After recrystallization from alcohol-ether, the pure product melts at 110–112°.

(b) *Ureidooxyacetic acid, ethyl ester.*—A solution of 7.7 g. (0.05 M) of hydroxylamine-O-acetic acid, ethyl ester, hydrochloride, 4 g. (0.05 M) of potassium isocyanate and 100 ml. of water is evaporated to dryness on a steam bath (2½ hours). The residual 10.5 g. of solid is recrystallized from 30 ml. of water to yield 5 g. (62%) of product melting at 119–120°.

The ureidooxyacetic acid ethyl ester is hydrolyzed in aqueous ethanol containing sodium hydroxide. The mixture is acidified with hydrochloric acid, concentrated to dryness and extracted with acetonitrile to remove the inorganic salts. Evaporation of the acetonitrile solution gives the desired ureidooxyacetic acid.

(c) *2H-1,2,4-oxadiazine-3,5-(4H,6H) - dione.*—To a solution of 3.9 g. (0.17 M) of sodium in 500 ml. of absolute alcohol are added 28 g. (0.17 M) of ureidooxyacetic acid ethyl ester. A white flocculent precipitate forms immediately. The mixture is stirred for 2 hours at room temperature and the solid is filtered to yield 23 g. of the sodium salt of 2H-1,2,4-oxadiazine-3,5-(4H,6H)-dione. This is dissolved in 100 ml. of water, cooled and made strongly acid with 20% hydrochloride acid. The white crystalline precipitate is filtered to yield 8 g. (40%) of product melting at 171–173°. Recrystallization from 160 ml. of acetonitrile yields 6 g. of pure product which melts at 173–175°.

Example 2

(a) *2-(aminoxy)propionic acid hydrochloride.*—To a solution of 98 g. (1.5 M) of potassium hydrochloride in 1 liter of absolute alcohol are added 103 g. (0.75 M) of benzohydroxamic acid. To this suspension is added a solution of 136 g. (0.75 M) of ethyl α-brompropionate in 500 ml. of absolute alcohol. The resulting mixture is allowed to stand 24 hours. The solid is filtered off and the filtrate is concentrated under reduced pressure. The viscous residue is extracted with 300 ml. of 80% alcohol and the extract is made slightly acid with 10% $H_2SO_4$. The $K_2SO_4$ is filtered off and the filtrate evaporated. The residue is heated with 1 liter of 5% HCl on a steam bath for 2 hours. On cooling, benzoic acid precipitates, the precipitate is filtered off and the filtrate concentrated to dryness. The residue is extracted with 1 liter of absolute alcohol; a small amount of insoluble material is filtered off and the filtrate again evaporated to dryness. The viscous residue is dissolved in 200 ml. of absolute alcohol and anhydrous ether added slowly. The crystalline solid which precipitates is filtered and weighs 45 g. (43%), melting at 155–160°. Recrystallization from alcohol-ether yields the pure compound, melting at 166–168°.

(b) *2-(aminoxy)propionic acid, ethyl ester hydrochloride.*—A solution of 35 g. (0.24 M) of 2-(aminoxy)propionic acid hydrochloride in 800 ml. of absolute alcohol is saturated with HCl gas (190 g.) at 0°. The solution is allowed to come to room temperature, refluxed 1 hour, and allowed to stand overnight. The alcohol is removed under reduced pressure and the viscous residue is triturated with dry ether to yield 14 g. (35%) of product melting at 79–81°. After recrystallization from alcohol-ether the pure product melts at 85–87°.

(c) *2-ureidooxypropionic acid ethyl ester.*—A solution of 8.5 g. (0.5 M) of 2-(aminoxy)propionic acid ethyl ester, 4 g. (0.5 M) of potassium isocyanate and 100 ml. of water is evaporated to dryness on a steam bath. The crystalline residue (11.5 g.) is extracted with 80 ml. of hot acetone. The acetone is evaporated and the viscous residue is triturated with hexane to yield 4 g. (46%) of crystalline solid melting at 60–62°. Recrystallization from acetone-hexane yields pure product melting at 62–64°.

(d) *6 - methyl - 2H - 1,2,4 - oxadiazine - 3,5-(4H,6H)-dione.*—To a solution of 1.6 g. of sodium (0.07 M) in 100 ml. of absolute alcohol is added a solution of 12 g. (0.7 M) of 2-ureido-oxypropionic acid ethyl ester in 50 ml. of absolute alcohol. A gelatinous precipitate forms immediately. The reaction mixture is stirred at room temperature for 2 hours; then the solid is filtered to yield 6 g. of sodium salt. The salt is dissolved in 200 ml. of water and stirred for 45 minutes with 20 ml. of a wet slurry of Amberlite IR-124 ion exchange resin (H cycle) [nuclear sulfonic cation (polystyrene-divinylbenzene) resin]. The mixture is filtered and lyophilized to yield 4 g. of a fluffy solid melting at 120–125°. After sublimation at 130° (oil bath) and 2 mm., the pure compound melts at 143–145°.

*Example 3.—2-ethyl-2H-1,2,4-oxadiazine-3,5-(4H,6H)-dione*

(a) *Hydroxylamine-O-acetic acid, methyl ester hydrochloride.*—Hydrogen chloride gas is passed through a suspension of 55 grams of hydroxylamine-O-acetic acid hemihydrochloride in 500 ml. of anhydrous methanol at 0° until the alcohol is saturated. The mixture is allowed to come to room temperature, refluxed for one hour and then allowed to cool overnight. The reaction mixture is diluted with an equal volume of ether. The precipitated solid is filtered and washed with ether to yield the desired product.

(b) *Acetaldehydeoxime-O-acetic acid, methyl ester.*—A mixture of 20 grams of acetaldehyde and 25.5 grams of hydroxylamine-O-acetic acid, methyl ester hydrochloride is suspended in 100 ml. of anhydrous pyridine and is kept at room temperature for 2 hours. One hundred ml. of methanol is added and the reaction mixture is heated to gentle reflux for an additional 2 hours. The solvents are then removed by concentration under reduced pressure and the residue triturated with 200 ml. of ice-water. The solution is saturated with sodium chloride and extracted several times with ether. The ether extracts are dried over anhydrous sodium sulfate, filtered and concentrated. The residue is purified by distillation under reduced pressure.

(c) *N-ethylhydroxylamine-O-acetic acid, methyl ester, hydrochloride.*—To a solution of 10 grams of acetaldehyde oxime-O-acetic acid, ethyl ester in 50 ml. of anhydrous methanol is added 2 grams of palladium on carbon (5%) and the mixture treated with hydrogen at 50 lbs./sq. in. in a Parr Hydrogenator. When the absorption of hydrogen is complete, the reaction mixture is filtered, diluted with anhydrous ether and treated with ethereal hydrogen chloride. The precipitated product is filtered and washed with anhydrous ether.

(d) *N'-ethylureidooxyacetic acid, methyl ester.* — A solution of 8.3 grams of N-ethylhydroxylamine-O-acetic acid, methyl ester hydrochloride, 4.1 grams of potassium isocyanate and 100 ml. of water is evaporated to dryness on a steam bath. The residue is crystallized from aqueous alcohol to yield the desired product.

(e) *2-ethyl-2H-1,2,4-oxadiazine - 3,5(4H,6H)-dione.*—To a solution of 4.6 grams of sodium in 500 ml. of anhydrous methanol are added 35.5 grams of N'-ethylureidooxy acetic acid, methyl ester, and the reaction mixture stirred at room temperature for 6 hours. The precipitated solid, the sodium salt of 2-ethyl-2H-1,2,4-oxadiazine-3,5-(4H,6H)-dione, is filtered and washed with anhydrous ether. This sodium salt is then dissolved in 200 ml. of water and the solution is acidified to pH 2 with 20% hydrochloric acid. The crystalline precipitate is filtered and washed with water to yield the desired product. It may be further purified by crystallization from acetonitrile.

*Example 4.—4-methyl-2H-1,2,4-oxadiazine-3,5-(4H,6H)-dione*

(a) *$N^3$-methylureidooxyacetic acid, ethyl ester.*—To a solution of 15.5 grams of hydroxylamine-O-acetic acid, ethyl ester hydrochloride (Example 1(a)) in 100 ml. of pyridine is added dropwise, with vigorous stirring at 5–15°, 5.7 grams of methyl isocyanate. The reaction mixture is then allowed to warm to room temperature. After 24 hours the reaction mixture is concentrated under reduced pressure and the viscous residue triturated with cold hexane and then ethe. The low melting solid is extracted with hot hexane and hot benzene to yield the desired compound, melting at 69–70°.

(b) *4-methyl - 2H-1,2,4 - oxadiazine - 3,5-(4H,6H)-dione.*—To a solution of 0.92 gram of sodium in 100 ml. of absolute ethanol is added a solution of 7 grams of $N^3$-methylureidooxyacetic acid, ethyl ester in 50 ml. of absolute ethanol. The reaction mixture is allowed to stand overnight at room temperature. The sodium salt of 4-methyl - 2H-1,2,4-oxadiazine - 3,5-(4H,6H)-dione, which precipitates, is filtered and dissolved in water. It is stirred with 20 ml. of a wet slurry of Amerlite IR–124 ion exchange resin (H cycle), filtered and lyophilized to yield the desired 4-methyl-2H-1,2,4-oxadiazine-3,5-(4H,6H)-dione.

*Example 5.—4-methyl-2H-1,2,4-oxadiazine-3,5-(4H,6H)-dione*

To a solution of 1.16 grams of 2H-1,2,4-oxadiazine-3,5-(4H,6H)-dione in 10 ml. of alcohol there is added 10 ml. of N sodium hydroxide solution. Two grams of methyl iodide are added to the reaction mixture and the mixture refluxed gently until neutral. The reaction mixture is concentrated to remove the alcohol and then treated with Amberlite IR 124 (H+ cycle) and Amberlite IR 45 (OH− cycle) [weak base anion exchange resin (polystyrene-polyamine)] to remove the inorganic salts. Concentration of the filtrate yields the desired product.

*Example 6.—2-ethyl-4-methyl-2H-1,2,4-oxadiazine-3,5-(4H,6H)-dione*

(a) *$N^3$ - methyl - N - ethylureidooxyacetic acid, methyl ester.*—To a solution of 16.5 grams of N-ethylhydrooxylamine-O-acetic acid, methyl ester liberated from its hydrochloride (Example 3(c)) in 200 ml. of anhydrous ether there is added dropwise with vigorous stirring at 5–15° a solution of 5.7 grams of methyl isocyanate in 50 ml. of anhydrous ether. The reaction mixture is allowed to stand overnight at room temperature and is then concentrated under reduced pressure to remove the solvent. The product so obtained is sufficiently pure for use in the next step.

(b) *2-ethyl-4-methyl-2H-1,2,4-oxadiazine-3,5-(4H,6H)-dione.*—To a solution of 1.2 grams of sodium in 50 ml. of anhydrous methanol there is added 11.1 grams of $N^3$-methyl-N'-ethylureidooxyacetic acid, methyl ester. The reaction mixture is warmed for two hours at 50° and is then concentrated under reduced pressure. The residue is dissolved in water, treated with Amberlite IR-124 ion exchange resin (acid cycle), and filtered. The filtrate is lyophilized to yield the desired product.

*Example 7.—2-ethyl-6-methyl-2H-1,2,4-oxadiazine-3,5-(4H,6H)-dione*

Following the procedure of Example 3 but substituting 2-aminoxypropionic acid hydrochloride (Example 2(a)) for an equivalent amount of hydroxylamine-O-acetic acid hemihydrochloride there is obtained 2-ethyl-6-methyl-2H-1,2,4-oxadiazine-3,5-(4H,6H)-dione.

*Example 8.—4,6-dimethyl-2H-1,2,4-oxadiazine-3,5-(4H,6H)-dione*

Following the procedure of Example 4 but substituting an equivalent amount of 2-(aminoxy)propionic acid, ethyl ester hydrochloride (Example 2(b)) for the hydroxylamine-O-acetic acid, ethyl ester hydrochloride, there is obtained the desired 4,6-dimethyl-2H-1,2,4-oxadiazine-3,5-(4H,6H)-dione.

*Example 9.—2-ethyl-4-n-propyl-6methyl-2H-1,2,4-oxadiazine-3,5-(4H,6H)-dione*

(a) *2-(ethylaminoxy)propionic acid, methyl ester hydrochloride.*—Following the procedure of Example 3(a), (b) and (c) but substituting an equivalent of 2-(aminoxy)-propionic acid, hydrochloride (Example 2(a)) for the hydroxylamine-O-acetic acid hemihydrochloride in Example 3(a) there is obtained 2-(ethylaminoxy)propionic acid, methyl ester hydrochloride.

(b) *2 - (N' - ethyl-$N^3$-propylureidooxy)propionic acid, methyl ester.*—To a solution of 18.3 grams of 2-(ethylaminoxy)propionic acid, methyl ester hydrochloride in 100 ml. of anhydrous pyridine is added dropwise, with vigorous stirring at 5–15°, 8.5 grams of n-propyl isocyanate. The reaction mixture is then allowed to warm to room temperature and after 24 hours is concentrated under reduced pressure. The viscous residue is triturated with hexane and ether and is then extracted with hot benzene. Concentration of the benzene extract yields the desired product.

(c) *2 - ethyl-4-n-propyl-6-methyl-2H-1,2,4-oxadiazine-3,5-(4H,6H)-dione.*—To a solution of 1.2 grams of sodium in 50 ml. of anhydrous methanol, there is added 12 grams of 2-(N'-ethyl-$N^3$-propylureidooxy)propionic acid, methyl ester. The reaction mixture is refluxed for 3 hours and is then concentrated under reduced pressure. The residue is dissolved in water, treated with Amberlite IR–124 ion exchange resin (acid cycle) and then filtered. Concentration of the filtrate yields the desired product.

*Example 10.—4-(3-dimethylaminopropyl)-6-methyl-2H-1,2,4-oxadiazine-3-5-(4H,6H)-dione*

To a suspension of 24 grams of a 50% sodium hydride dispersion (in oil) in 250 ml. of toluene there is added 6.5 grams of 6-methyl-2H-1,2,4-oxadiazine-3,5-(4H,6H)-dione. After one hour stirring at room temperature, during which time the original vigorous evolution of hydrogen has essential ceased, the reaction mixture is treated dropwise with a solution of 6.8 grams of dimethylaminopropyl chloride in 100 ml. of toluene. The reaction mixture is heated to 90° and maintained at this temperature for 3 hours. The reaction mixture is cooled, filtered to remove the inorganic salt, and extracted with 10% hydrochloric acid. The acid extract is neutralized, saturated with sodium chloride and extracted with ether. Concentration of the ether extract yields the desired product.

The product may be converted to pharmaceutically accepted salts by treatment of an ether solution of the base with an ethereal or alcoholic solution of the pharmaceutically accepted acid and recovering the salt by filtration or concentration.

*Example 11*

By substituting for the dimethylaminopropyl chloride in Example 10 equivalent proportions of 3-morpholinopropyl chloride 2-(4-methylpiperazino)-ethyl chloride or 2-(homopiperazino)ethyl chloride, respectively, there are obtained 6-methyl-4-(3-morpholinopropyl)-2H-1,2,4-oxadiazine - 3,5 - (4H,6H)-dione, 4[2-(4-methylpiperazino)-ethyl] - 6-methyl-2H-1,2,4-oxadiazine-3,5-(4H,6H)-dione and 4-[2-(homopiperazino)ethyl]-6-methyl-2H-1,2,4-oxadiazine-3,5-(4H,6H)-dione.

What is claimed is:

1. A compound of the formula

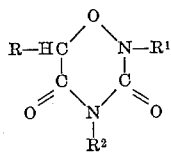

wherein R and $R^1$ each is a member of the group consisting of hydrogen and lower alkyl, $R^2$ is a member of the group consisting of hydrogen, alkyl and B-lower alkyl, and B is a basic nitrogen containing group of less than 12 carbon atoms selected from the group consisting of amino, lower alkyl amino, 5 to 7 membered nitrogen-containing heterocyclics selected from the group consisting of piperidino, piperazino, $N^4$-lower alkylpiperazino, $N^4$-hydroxy-lower alkylpiperazino, $N^4$-lower alkoxy-lower alkylpiperazino, morpholino, pyrrolidino and thiamorpholino, and salts thereof.

2. A compound of the formula

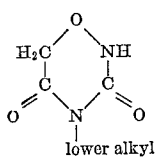

3. A compound of the formula

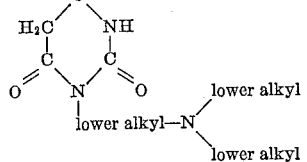

4. A compound of the formula

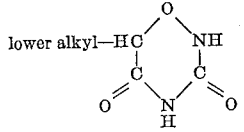

5. 2H-1,2,4-oxadiazine-3,5-(4H,6H)-dione.
6. 6-methyl-2H-1,2,4-oxadiazine-3,5-(4H,6H)-dione.

References Cited by the Examiner

UNITED STATES PATENTS

| | | | |
|---|---|---|---|
| 3,030,362 | 4/1962 | England | 260—244 |
| 3,112,342 | 11/1963 | Luckenbaugh | 260—553 |
| 3,121,113 | 2/1964 | Bernstein et al. | 260—553 |
| 3,122,537 | 2/1964 | Trepanier | 260—244 |

OTHER REFERENCES

Winternitz et al., "Bull. Soc. Chim. France," 1958, pp. 664–9.

WALTER A. MODANCE, *Primary Examiner.*

NICHOLAS S. RIZZO, ROBERT T. BOND,
*Assistant Examiners.*